United States Patent
Dinh

(10) Patent No.: US 7,476,803 B2
(45) Date of Patent: Jan. 13, 2009

(54) MULTI-MEDIA RECESSED DATA LOW VOLTAGE BOX WITH COVER

(75) Inventor: Cong Thanh Dinh, Collierville, TN (US)

(73) Assignee: Thomas & Betts International, Inc., Wilmington, DE (US)

(*) Notice: Subject to any disclaimer, the term of this patent is extended or adjusted under 35 U.S.C. 154(b) by 0 days.

(21) Appl. No.: 11/903,353

(22) Filed: Sep. 21, 2007

(65) Prior Publication Data

US 2008/0264667 A1 Oct. 30, 2008

Related U.S. Application Data

(60) Provisional application No. 60/927,075, filed on May 1, 2007, provisional application No. 60/926,574, filed on Apr. 27, 2007.

(51) Int. Cl.
*H02G 3/08* (2006.01)

(52) U.S. Cl. .............. 174/50; 174/53; 174/58; 220/3.2; 248/906; 439/535

(58) Field of Classification Search ........... 174/50, 174/53, 54, 61, 63, 480; 220/3.2, 3.3, 3.7, 220/3.8, 3.9, 4.02; 439/535; 248/906, 343; D13/152

See application file for complete search history.

(56) References Cited

U.S. PATENT DOCUMENTS

| | | | |
|---|---|---|---|
| 2,916,733 A * | 12/1959 | Hirsch ............. 340/545.2 |
| 4,569,458 A * | 2/1986 | Horsley ............. 220/3.6 |
| 4,757,158 A * | 7/1988 | Lentz ............. 174/53 |
| D314,748 S | 2/1991 | Littrell | |
| D378,674 S | 4/1997 | Volansky et al. | |
| 5,676,566 A | 10/1997 | Carlson, Jr. et al. | |
| 5,721,394 A | 2/1998 | Mulks | |
| 5,807,139 A | 9/1998 | Volansky et al. | |
| D408,015 S | 4/1999 | Faucher | |
| 5,947,765 A | 9/1999 | Carlson, Jr. et al. | |
| D418,481 S | 1/2000 | Lin | |
| 6,086,414 A | 7/2000 | Tipton et al. | |
| 6,200,159 B1 | 3/2001 | Chou | |
| D451,479 S | 12/2001 | Bateson et al. | |
| 6,350,151 B1 | 2/2002 | Elliot et al. | |
| 6,444,906 B1 | 9/2002 | Lewis | |
| 6,461,951 B1 | 10/2002 | Baxter et al. | |
| 6,642,450 B1 | 11/2003 | Hsiao | |
| 6,896,547 B2 | 5/2005 | Caveney | |
| 6,953,890 B2 * | 10/2005 | Koessler ............. 174/50 |
| 7,075,004 B1 | 7/2006 | Gretz | |
| 7,105,743 B2 | 9/2006 | Caveney | |
| 7,151,219 B1 * | 12/2006 | Gretz ............. 174/58 |
| 7,154,040 B1 * | 12/2006 | Tompkins ............. 174/50 |

* cited by examiner

*Primary Examiner*—Dhiru R Patel
(74) *Attorney, Agent, or Firm*—Hoffmann & Baron, LLP

(57) ABSTRACT

An electrical box for housing electrical components that includes: a body having a back wall, a face plate, a perimeter wall therebetween and an interior. The back wall has one or more removable elements for forming apertures that receive one or more low voltage connectors. A cover fits over an opening in the face plate and one or more rotatable mounting brackets located near the end walls are used to mount the box in a wall.

16 Claims, 5 Drawing Sheets

MULTI-MEDIA RECESSED DATA LOW VOLTAGE BOX WITH COVER

This application claims priority from provisional application Ser. No. 60/926,574, filed on Apr. 27, 2007, and provisional application Ser. No. 60/927,075, filed on May 1, 2007, both of which are incorporated herein in their entirety.

FIELD OF THE INVENTION

The invention relates to a recessed, in-wall, electrical connector box for low voltage wiring. In particular, the invention relates to a recessed, in-wall, electrical connector box for connecting a plurality of low voltage data lines.

BACKGROUND OF INVENTION

Electrical outlet boxes for housing electrical fixtures, such as switches and receptacles, are well known. Electrical outlet boxes typically have openings for inserting electrical wires into the box so that they can be terminated to the electrical fixtures inside. The fixtures are mounted inside the box in a manner that provides protection for the fixtures as well as the wire terminations. Such outlet boxes are generally mounted to a wall stud at a location that provides convenient access for the users. The outlet boxes can accommodate one or more electrical fixtures and the fixtures can operate using different voltages, such as 110 volts AC.

In some applications, electrical outlet boxes are also used to terminate communications wires for data, voice and signal transmission. These types of terminations typically involve low voltage signals which, in most cases, are not required under electrical and building codes to be housed in an electrical box. In contrast, electrical terminations for switches and receptacles operating at higher voltages must be housed in an electrical box. However, in order to protect low voltage connectors from damage and provide uninterrupted operation, it is desirable to locate the connectors in electrical boxes. Moreover, it has been found to be cost effective to use an electrical box that can accommodate more than one connector. Existing connector boxes do not accommodate multiple connectors and a separate box or support for each connector or termination must often be used.

Accordingly, there is a need for an electrical connector box that provides easy and convenient terminations for a plurality of different low voltage connectors.

SUMMARY OF THE INVENTION

The present invention is an electrical box for housing electrical components that includes: a body having a back wall, a face plate, a perimeter wall therebetween and an interior. The perimeter wall can be formed by three or more wall sections or it can have a substantially round or oval shape. Preferably, the perimeter wall of the body is formed by a pair of side walls and a pair of end walls. The back wall includes one or more removable elements for forming apertures that receive one or more low voltage connectors. The face plate has an opening for accessing the interior and can have an edge around the opening. The electrical box can also include a cover that corresponds in shape to the shape of the opening. The cover fits over the opening in the face plate and is preferably flush with the edge in the face plate. In some embodiments, the perimeter wall is connected to the face plate by one or more ledges and the cover contacts the ledges when in the closed position. When the perimeter wall is formed by a pair of end walls and a pair of side walls, at least one of the end walls and/or at least one of the side walls is connected to the face plate by a ledge and the cover contacts at least one of the ledges when in the closed position.

The electrical box can include one or more rotatable mounting brackets located near the end walls, which are movable between a recessed and an extended position. The brackets are moved into the recessed position when the box is inserted into a wall cut-out and then rotated into the extended position to attach the box to the wall. Each of the one or more rotatable mounting brackets is operatively connected to a screw which is accessible from the interior. Turning the screw rotates the brackets.

The electrical box can also include one or more transition walls located between the perimeter wall, or the wall sections that form the perimeter wall, and the back wall. The transition wall includes a plurality of removable elements for providing access to the interior. The cover can also include a plurality of removable elements that provide access to the interior.

The apertures in the back wall can be used to mount a variety of different connectors having the same or different cut-out dimensions. Preferably, the dimensions of the apertures correspond to the cut-out dimensions of an f-type connector, an RCA type connector, a RJ-6 connector, a RJ-45 connector, a high-definition multimedia interface ("hdmi") connector, a digital visual interface ("dvi") connector or a fiber optics signal connector. However, the number of apertures and their dimensions are not intended to limit the invention.

BRIEF DESCRIPTION OF THE FIGURES

The preferred embodiments of the electrical box of the present invention, as well as other objects, features and advantages of this invention, will be apparent from the accompanying drawings wherein.

DETAILED DESCRIPTION OF THE INVENTION

Figure 1:
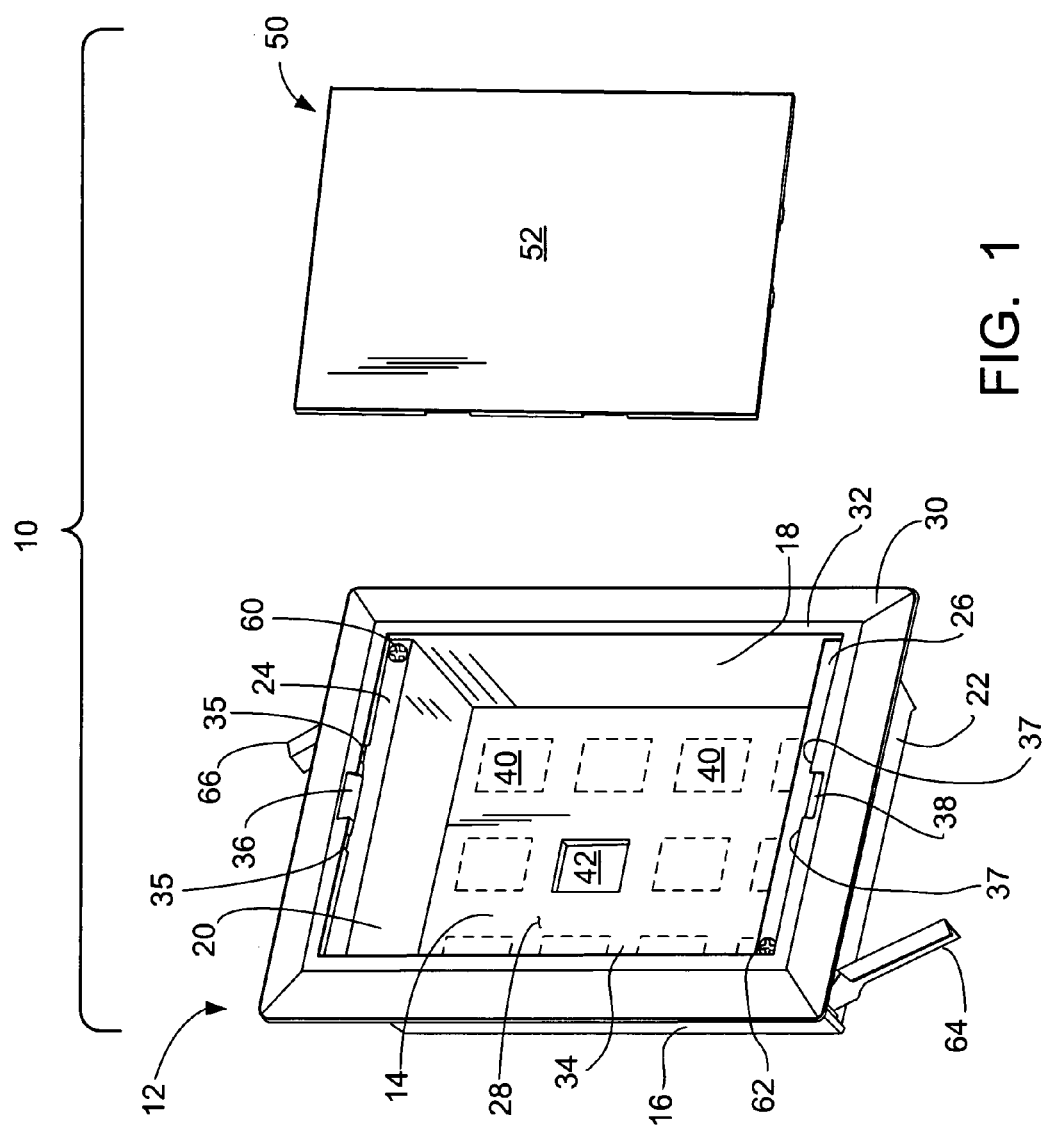
FIG. 1 is a front perspective view of a first embodiment of the electrical box with the cover removed to show the box interior.

The present invention provides an electrical box for housing a plurality of the same or different low voltage connectors. The electrical box can be formed from sheet metal or a plastic material and includes a body having a back wall, a front face plate and a perimeter wall extending therebetween. The back wall includes one or more removable elements that form apertures for receiving one or more low voltage connectors. The face plate has an opening for accessing the interior of the box and the connectors that are mounted on the back wall. The perimeter wall typically has a rectangular shape and is formed by four wall sections, a pair of side walls and a pair of end walls. However, this is not a limitation and the invention includes electrical boxes having three perimeter wall sections and more than four perimeter wall sections, as well as a single perimeter wall section that has an oval or round shape. The electrical box can also have a cover, which fits over the opening and encloses the interior.

The back wall has one or more removable elements which are also referred to as "knockouts" that can easily be removed using a utility knife or screwdriver. The use of removable elements or knockouts in electrical outlet boxes is well known to those skilled in the art and they allow a user to form only as many apertures in the back wall as required by a particular application. This avoids the situation where an electrical box with pre-formed apertures is used and the installer does not use all of the apertures. The unused apertures then have to be closed using filler plates so that dirt and/or moisture cannot enter the box. The removable elements can have the same dimensions or different dimensions that correspond to the cut-out dimensions for a single type or a variety of different types of connectors. This allows a user to select an electrical box for connectors having the same cut-out dimensions or an electrical box for a variety of different connectors having different cut-out dimensions.

One or more of the removable elements or knockouts is removed to create an opening and a connector or binding post is inserted into the opening from the rear of the box. The cable connector is then secured to the back wall using well known techniques, such as a "snap-in" device provided with the connector or binding post. Preferably, the dimensions of the knockout openings correspond to the standard cut-out dimensions of the snap-in cable connectors and binding posts that are mounted in the back wall. The cable connectors mounted in the back wall are accessed through the front of the electrical box to make connections with mating connectors. Preferably, a female connector is mounted in the back wall and a male connector is inserted through the front of the electrical box and connected to the female connector. However, the configuration can be reversed and a male connector can be mounted in the back wall. In a typical application, the connectors in the electrical box are used for wires or cables that are installed in a wall for various data and media functions, for example cables for Ethernet, coaxial cable for video signals, speaker wires for audio signals or other low voltage or optical cables such as a high-definition multimedia interface ("hdmi"), a digital visual interface ("dvi"), or a TOSLINK® fiber optics signal connector.

The back wall of the body can be connected to the side walls and/or end walls by one or more transition wall sections. These transition wall sections extend upwardly from the back wall towards the front of the body at an angle of between about 15 and 75 degrees, preferably between about 30 and 60 degrees and most preferably about 45 degrees. The angle of the transition wall section or sections makes it easier for a user to access connectors that are mounted near the side or end walls. This provides an electrical box with an interior that does not have any hard to reach or cramped corners.

The face plate extends outwardly from and substantially perpendicular to the perimeter wall to form a flange around the opening in the front of the box. When the electrical box is installed in a wall or floor cut-out, the cut-out is large enough to allow the perimeter wall of the body to pass through but not the face plate, which contacts the surface of the wall around the cut-out. In new constructions, the electrical box can be attached to a stud using screws, nails or other types of fasteners. When the box is installed in an existing wall structure, a cut-out is made in the wall and rotatable mounting brackets can be used to secure the box in place.

The shape of the cover corresponds to the shape of the opening in the face plate, preferably a rectangular shape, with a side edge extending around the perimeter of the cover. When the cover is in the closed position, it contacts one or more ledges at the front of the box that extend between the end walls and/or the side walls and the face plate. The ledges are recessed from the surface of the face plate so that the top surface of the cover is substantially flush with the top surface or edge of the face plate. A variety of different mechanism can be used for securing the cover to the body, including snaps, fasteners, hinges and tabs. A notch can be provided near the interior edge of the face plate so that a user has an easily accessible finger hold for removing the cover. The cover can also have one or more knockouts which can be removed to create apertures that act as access ports. These apertures can be used to pass wires and/or cables into the box for termination with different types of connectors mounted on the back wall.

At least one rotatable mounting bracket that includes a tapped cylindrical base and an arm extending outwardly and perpendicularly from the longitudinal axis of the cylindrical base is positioned at each of the end walls of the box near the corner formed with the adjoining side wall. The mounting brackets can be attached to the end walls so that the cylindrical base can be freely rotated. Mounting screws are inserted into the tapped cylindrical base through apertures in the front of the box to retain the mounting bracket in place. After the box is inserted into a cut-out in an existing wall, the mounting screws are turned clockwise and rotate the cylindrical base so that the arms pivot away from the end walls. The side walls or a member attached to the perimeter wall of the body can extend above the end walls to prevent the arms from rotating more than about 90 degrees from the surface of the end wall. When an arm contacts a side wall or member, it stops rotating and the continued turning of the screw begins to move the arm toward the face plate at the front of the box until the arm engages the wall. The mounting screw continues to be turned until the wall is wedged between the arm and the back side of face plate, thereby securing the electrical box in place.

Referring to the drawings, FIG. 1 shows a preferred embodiment of the electrical box 10 that includes a body 12 and a cover 50. The body 12 is generally rectangular in shape and has a back wall 14 and a face plate 30 connected by a perimeter wall, which is formed by a pair of side walls 16, 18 and a pair of end walls 20, 22. Each of the end walls 20, 22 has a ledge 24, 26 that connects the top of each end wall 20, 22 to the face plate 30. The face plate 30 has an opening 34 for accessing the interior 28 of the body 12 and an edge 32 that extends around the perimeter of the opening 34. The cover 50 is placed over the opening 34 in the face plate 30 and contacts the ledges 24, 26 so that the front surface 52 of the cover 50 is substantially flush with the edge 32 of the face plate 30. A pair of recesses 35, 37 adjacent the edge 32 accept mating tabs 39, 41 (see FIG. 4) located on the cover 50 therein. These recesses 35, 37 are preferably located on opposite sides of the slots 36, 38. When the cover 50 is placed over the opening 34, the tabs 39, 41 slide within the recesses 35, 37 and the cover 50 snaps into a closed position. The cover 50 is removed by inserting a tool, such as a flat-blade screwdriver, into the slots 36, 38 and twisting. Other devices for securing the cover 50 to the body 12, such as latches, locks and fasteners, can also be used.

Removing the cover 50 reveals the interior 28 of the box 10 including the back wall 14, which has a plurality of removable elements 40 for forming apertures 42 that can receive a plurality of low voltage connectors (not shown). FIG. 1 also shows a pair of rotatable mounting brackets 64, 66 located next to the end walls 20, 22 at diagonally opposing corners of the body 12. The mounting brackets 64, 66 are used when the electrical box 10 is mounted in an existing wall and the installer is unable to attach the box 10 to a wall stud. The mounting brackets 64, 66 swing outwardly from the end walls 20, 22 after the body 12 is passed through a wall cut-out by rotating mounting screws 60, 62.

The face plate 30 extends outwardly from and substantially perpendicular to the perimeter wall (i.e., the side walls 16, 18 and end walls 20, 22) and forms a flange at the front of the body 12. When the body 12 is installed in a wall (not shown), the dimensions of the cut-out in the wall are slightly greater than dimensions of the perimeter wall, but less than the dimensions of the face plate 30. The body 12 passes through the cut-out until the back of the face plate 30 contacts the front surface of the wall.

Figure 2:
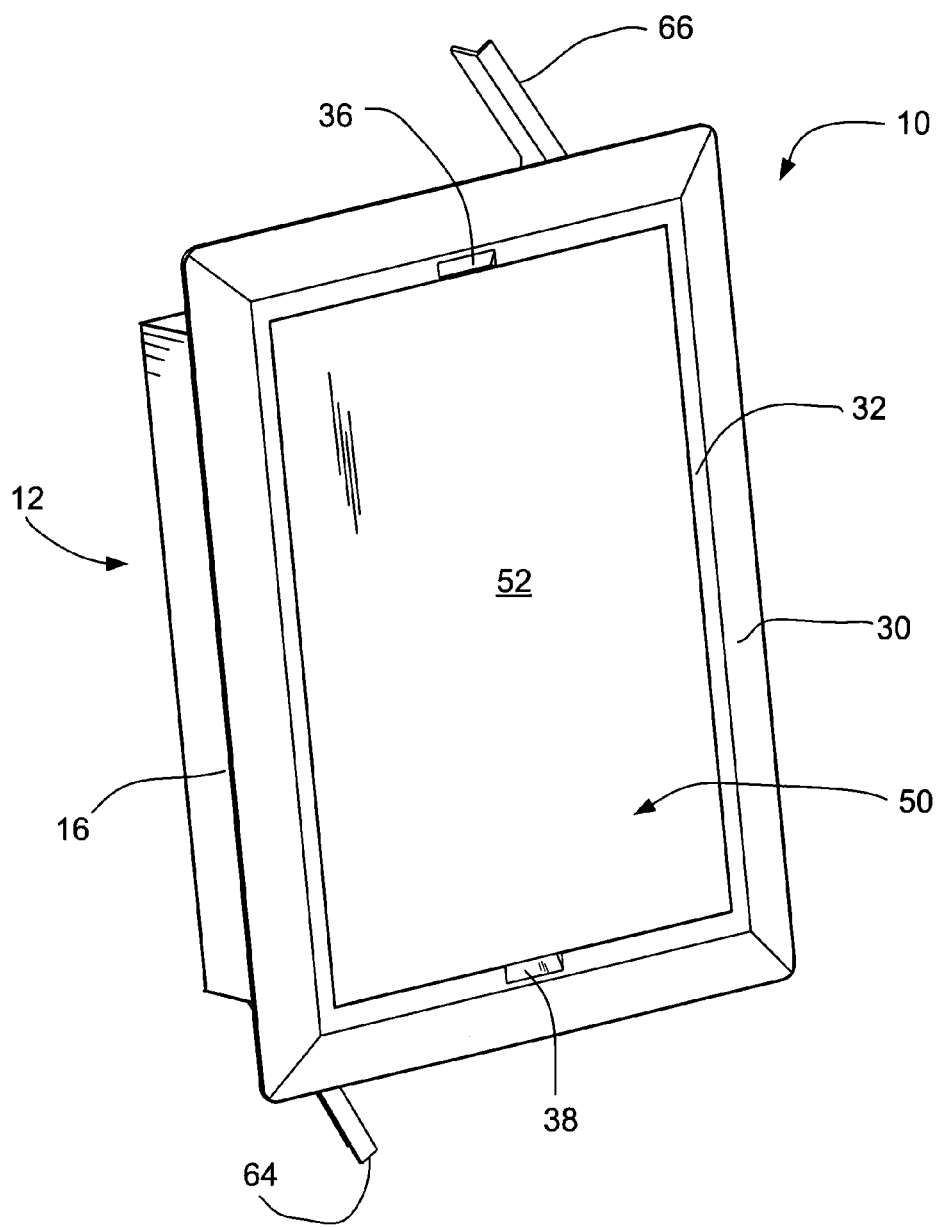
FIG. 2 is a front perspective view of the first embodiment of the electrical box with the cover in the closed position.

FIG. 2 shows an embodiment of the electrical box 10 with the cover 50 secured to the body 12 in the closed position. The cover 50 fits over the opening 34 (see FIG. 1) and the front surface 52 of the cover 50 aligns with the surface of the edge 32 in the face plate 30. The cover 50 can have a gasket (not shown) around its perimeter to provide additional protection from the environment.

Figure 3:
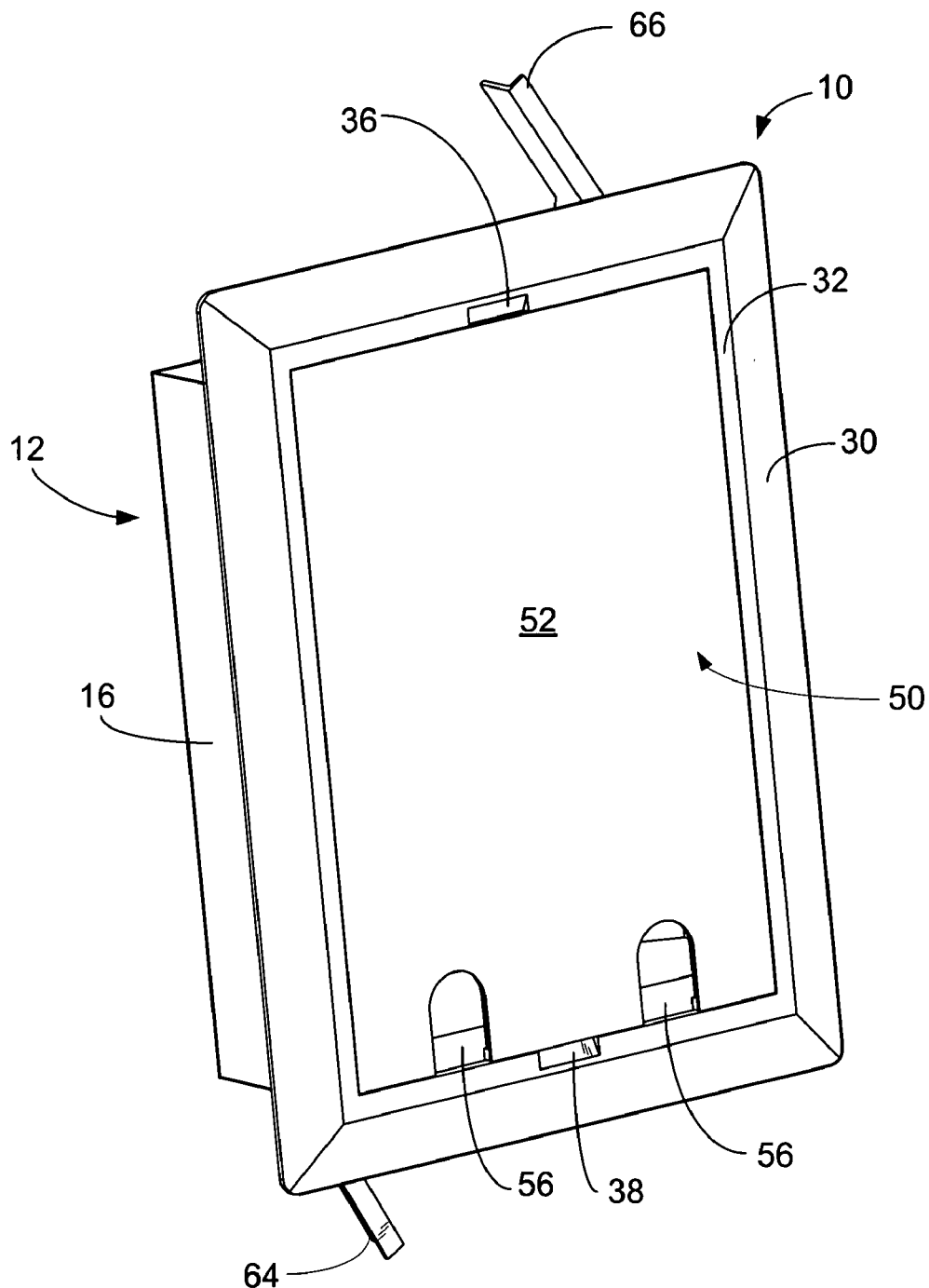
FIG. 3 is a front perspective view of the first embodiment of the electrical box with the cover in the closed position and a pair of knockouts removed from the cover.

FIG. 3 shows an embodiment of the electrical box 10 with two knockouts 58 (see FIG. 4) removed to form two apertures 56 in the cover 50. The apertures 56 are used for accessing the interior 28 of the box 10. Wires and or cables (not shown) that are being connected to the connectors (not shown) mounted on the back wall 14 (see FIG. 1) enter the box 10 through these apertures 56. The user can remove as many knockouts 58 as required for a particular application.

Figure 4:
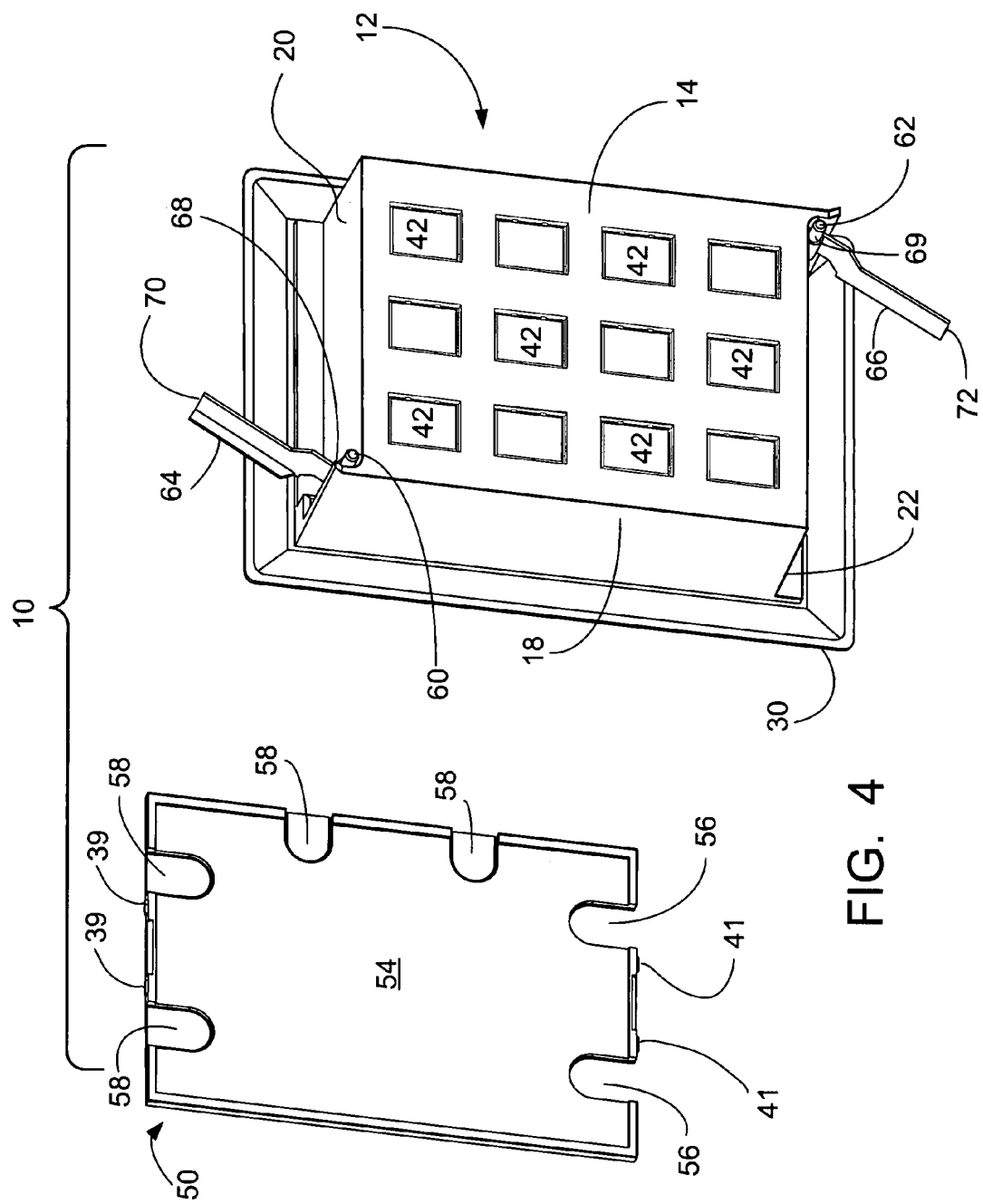
FIG. 4 is a rear perspective view of the first embodiment of the electrical box with the cover removed.

FIG. 4 shows the rear of an embodiment of the electrical box 10 with all of the removable elements 40 (see FIG. 1) removed to provide a plurality of apertures 42. These apertures 42 can be used for mounting connectors (not shown) in the back wall 14 of the box 10. The mating connectors (not shown) can then be connected to these connectors through the front of the box 10 after the box 10 is installed in a wall. FIG. 4 also shows two apertures 56 in the cover 50 for cable access. The cover 50 includes other knockouts 58 that can be removed to form as many additional apertures 56 in the cover 50 as the user needs. The knock-outs 58 are formed by removing material from only the rear or inside surface 54 of the cover 50 so that the front or outside surface 52 remains smooth and uninterrupted by any surface unevenness.

FIG. 4 shows rotatable mounting brackets 64, 66 located next to the end walls 20, 22 at diagonally opposing corners of the body 12. The rotatable mounting brackets 64, 66 are offset from the rear of the face plate 30 so that they can be used to mount the box 10 in walls having a thickness of up to about one inch. However, this is not a limitation and the rotatable mounting brackets 64, 66 can be used for walls having a thickness greater than one inch by locating them further away from the rear of the face plate 30. The side walls 16, 18 can extend above the rotatable mounting brackets 64, 66 to protect them from damage when the box 10 is inserted into a wall cut-out. After the box 10 is inserted into a wall cut-out, the screws 60, 62 (see FIG. 1) are rotated and tightened until the rotatable mounting brackets 64, 66 engage the back side of the wall.

Each of the rotatable mounting brackets 64, 66 includes a tapped cylindrical base 68, 69, which receives a mounting screw 60, 62, and an arm 70, 72 extending outwardly from the cylindrical base 68, 69. The mounting screws 60, 62 are inserted through an opening in the ledge 24, 26 at the front of the box 10 and engage the tapped cylindrical bases 68, 69. When the body 12 is inserted in a wall cut-out, each of the arms 70, 72 is positioned parallel to the surface of the end walls 20, 22. After the body 12 is in the wall, the mounting screws 60, 62 are turned clockwise to rotate the mounting brackets 64, 66 until the arms 70, 72 are perpendicular to the surface of the end walls 20, 22 and contact the side walls 16, 18 of the box 10. As the mounting screws continue to be turned, the arms 70, 72 move toward the face plate 30 and engage the rear surface of the wall.

Figure 5:
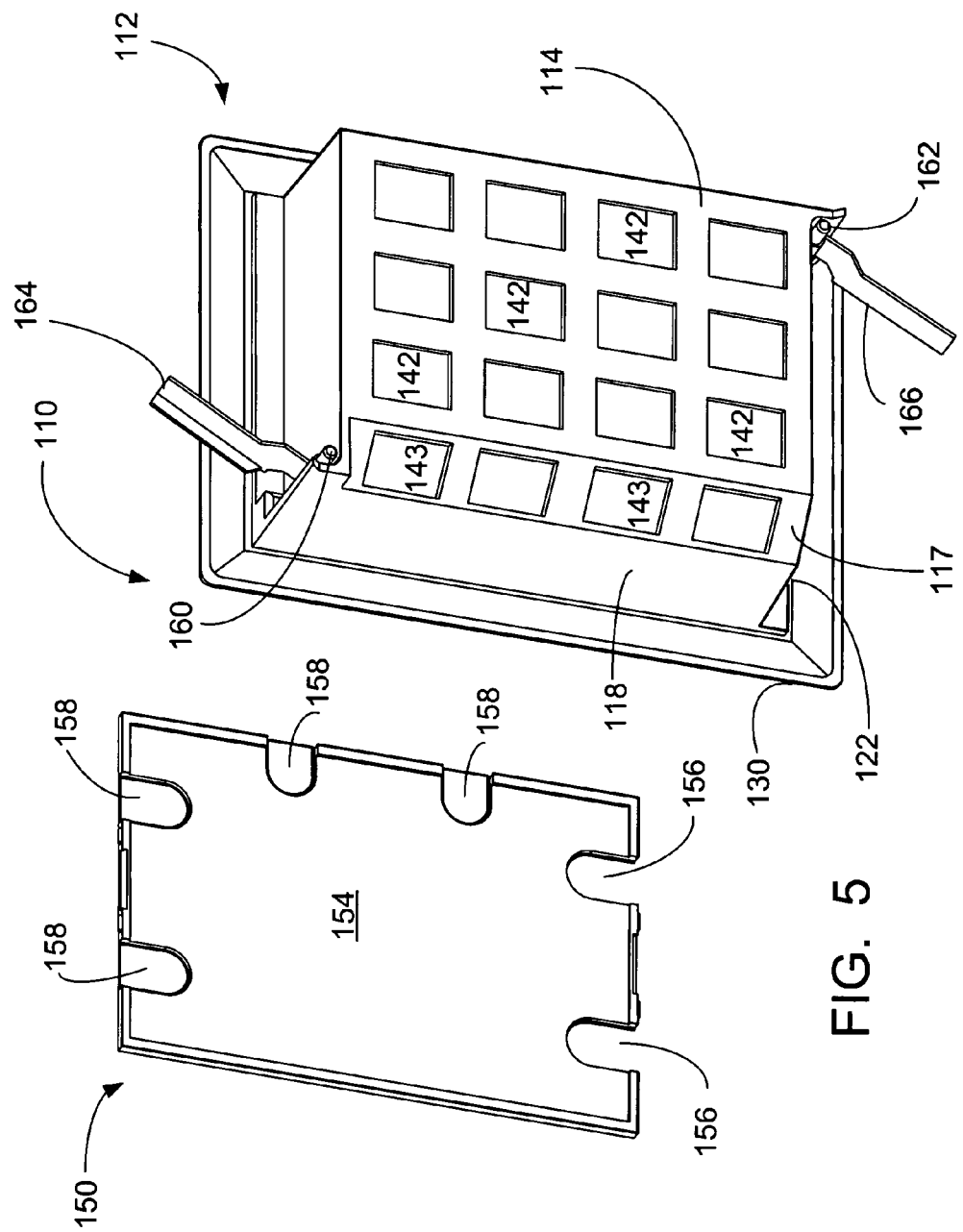
FIG. 5 is a rear perspective view of a second embodiment of the electrical box with a transition wall and the cover removed.

FIG. 5 shows another embodiment of the electrical box 110 in which the body 112 includes an offset or angled transition wall 117 that extends between the back wall 114 and one of the side walls 118. The transition wall 117 makes it easier for a user to access the connectors (not shown) mounted in the apertures 143 in the corners of the interior of the body 112. FIG. 5 shows the body 112 of an electrical box 110 with one transition wall 117. However, the body 112 can have additional transition walls which make the connectors mounted in these walls more accessible. These additional transition walls can be located between the back wall 114 and the other side wall 116 or between the back wall 114 and one or both of the end walls 120, 122. Knockouts 158 on the rear surface 154 of the cover 150 can be removed to access the connectors mounted on the back wall 114.

FIG. 5 also illustrates the operation of the rotatable mounting brackets 164, 166 which are shown in a partially extended position. Before the box 110 is installed in a wall, the mounting screws 160, 162 are rotated counterclockwise to position the mounting brackets 164, 166 parallel to the end walls 120, 122. After the box 110 is inserted through the cut-out in the wall (not shown) and the rear surface of the face plate 130 contacts the wall, the mounting screws 160, 162 are rotated in the clockwise direction to pivot the mounting brackets 164, 166 outwardly and away from the surfaces of the end walls 120, 122 into an extended position. After the mounting brackets 164, 166 are rotated into an extended position, further rotation of the mounting screws 160, 162 moves the mounting brackets 164, 166 towards the wall (not shown) and the face plate 130 on the opposing side of the wall. Once the mounting screws 160, 162 are fully tightened, the body 112 is secured to the wall.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

I claim:

1. An electrical box for housing electrical components comprising:
   a body having a back wall, a face plate, a perimeter wall therebetween and an interior, wherein the back wall comprises one or more removable elements for forming apertures for receiving one or more low voltage connectors and wherein the face plate has an opening for accessing the interior;
   a transition wall between the perimeter wall and the back wall, wherein the transition wall comprises one or more removable elements for providing access to the interior; and
   a cover, wherein the cover fits over the opening.

2. An electrical box for housing electrical components according to claim 1, further comprising one or more rotatable mounting brackets, movable between a recessed and an extended position.

3. An electrical box for housing electrical components according to claim 2, wherein each of the one or more rotatable mounting brackets is operatively connected to a screw which is accessible from the interior.

4. An electrical box for housing electrical components according to claim 1, wherein the cover comprises a plurality of removable elements for providing access to the interior.

5. An electrical box for housing electrical components according to claim 1, wherein the faceplate comprises an edge around the opening.

6. An electrical box for housing electrical components according to claim 1, wherein the apertures in the back wall have dimensions which correspond to the cut-out dimensions of an f-type connector, an RCA (Radio Corporation of America) type connector, a Registration jack 6 ("RJ-6"connector, a Registration jack 45 ("RJ-45")connector, a high-definition multimedia interface ("hdmi") connector, a digital visual interface ("dvi") connector or a fiber optics signal connector.

7. An electrical box for housing electrical components according to claim 1, wherein the perimeter wall is formed by five or more side wall sections.

8. An electrical box for housing electrical components according to claim 1, wherein the perimeter wall has a substantially round or oval shape.

9. An electrical box for housing electrical components according to claim 1, wherein the perimeter wall is connected to the face plate by one or more ledges, and wherein the cover contacts the ledges when in the closed position.

10. An electrical box for housing electrical components comprising:
   a body having a back wall, a face plate, a pair of side walls and a pair of end walls therebetween and an interior, wherein the back wall comprises one or more removable elements for forming apertures for receiving one or more low voltage connectors and wherein the face plate has an opening for accessing the interior;
   a transition wall between one of the end walls or side walls and the back wall, wherein the transition wall comprises one or more removable elements for providing access to the interior; and
   a cover, wherein the cover fits over the opening.

11. An electrical box for housing electrical components according to claim 10, further comprising one or more rotatable mounting brackets, movable between a recessed and an extended position.

12. An electrical box for housing electrical components according to claim 11, wherein each of the one or more rotatable mounting brackets is operatively connected to a screw which is accessible from the interior.

13. An electrical box for housing electrical components according to claim 10, wherein the cover comprises a plurality of removable elements for providing access to the interior.

14. An electrical box for housing electrical components according to claim 10, wherein the faceplate comprises an edge around the opening.

15. An electrical box for housing electrical components according to claim 10, wherein the apertures in the back wall have dimensions which correspond to the cut-out dimensions of an f-type connector, an RCA (Radio Corporation of America) type connector, a Registration jack 6 ("RJ-6") connector, a Registration jack 45 ("RJ-45") connector, a high-definition multimedia interface ("hdmi") connector, a digital visual interface ("dvi") connector or a fiber optics signal connector.

16. An electrical box for housing electrical components according to claim 10, wherein at least one of the end walls and/or at least one of the side walls is connected to the face plate by a ledge, and wherein the cover contacts at least one of the ledges when in the closed position.

* * * * *